United States Patent [19]
Mehl

[11] 3,724,083
[45] Apr. 3, 1973

[54] MAGNETIC STRIP DRAFTING INSTRUMENT

[76] Inventor: Charles W. Mehl, P.O. Box 728, Redlands, Calif.

[22] Filed: Apr. 17, 1970

[21] Appl. No.: 29,427

[52] U.S. Cl................33/177, 235/70 R, 335/303, 33/137
[51] Int. Cl. .............................................B43l 13/20
[58] Field of Search...33/137, 161, 177, 176, DIG. 1; 335/303; 235/70 R, 70 A

[56] References Cited

UNITED STATES PATENTS

| 1,892,032 | 12/1932 | Arnold | 33/161 |
| 3,229,030 | 1/1966 | Baermann | 335/303 |

FOREIGN PATENTS OR APPLICATIONS

| 649,933 | 6/1964 | Belgium | 33/177 |
| 88,871 | 4/1967 | France | 33/177 |
| 679,163 | 5/1964 | Canada | 335/303 |

Primary Examiner—William D. Martin, Jr.
Assistant Examiner—Dennis A. Dearing
Attorney—Herbert E. Kidder

[57] ABSTRACT

An instrument comprising two or more elongated flexible strips of plastic having magnetic properties such that when the strips are in a first position relative to one another, they overlap their full widths and cling together to form a multiple thickness assembly; and in a second position with the ends of one strip reversed relative to the other, they overlap only half widths. In the first position, the strips form a laminated flexible drafting spline which adheres to a sheet-steel-faced board underlying a sheet of drawing paper. There are measurement graduations and indicia along the edges and the two overlapping strips can be slipped endwise with respect to one another to form an extensible measuring tape for measuring distances along curved lines. Strips with logarithmic graduations can be used in said second position to form a slide rule.

1 Claim, 7 Drawing Figures

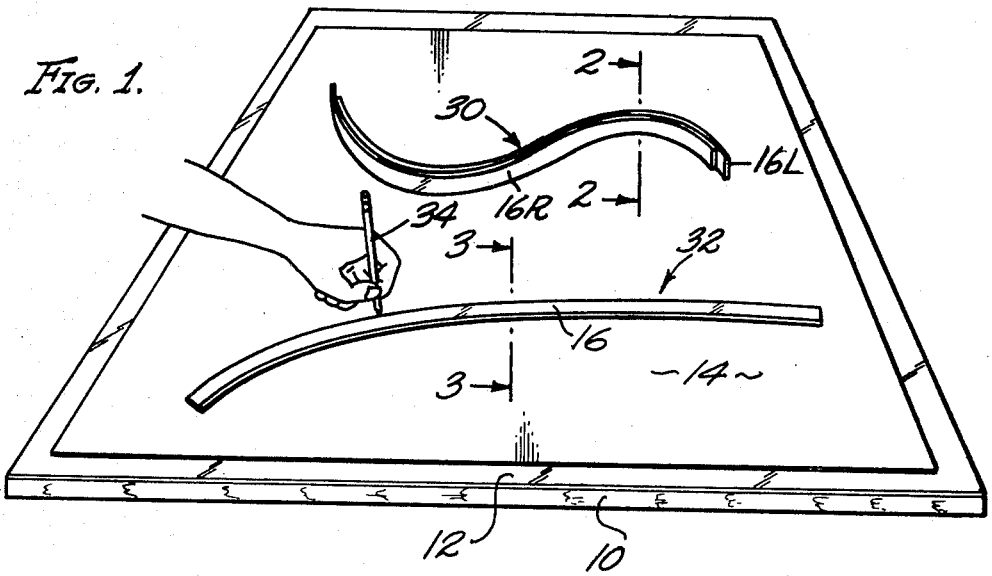
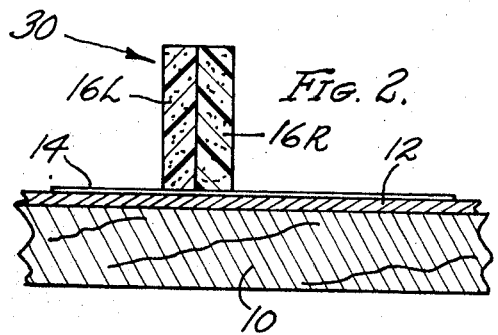
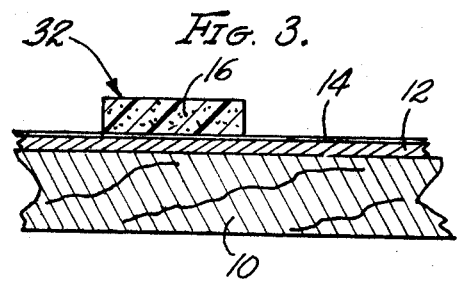
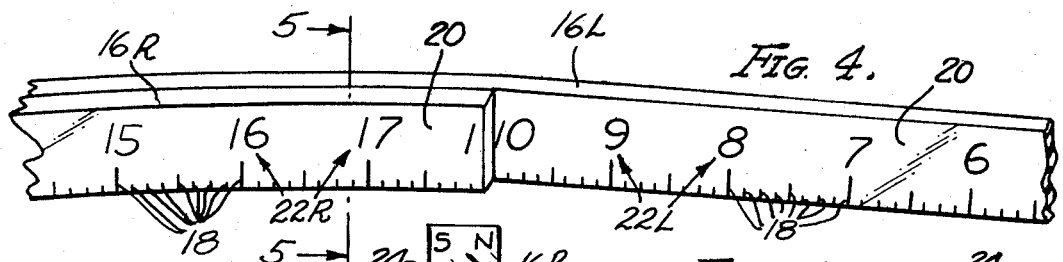
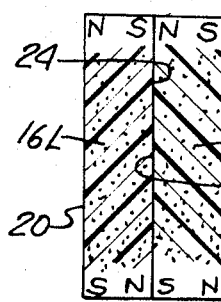
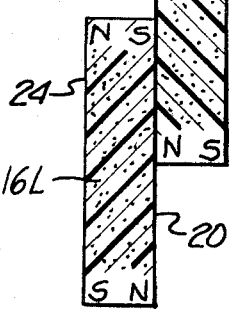
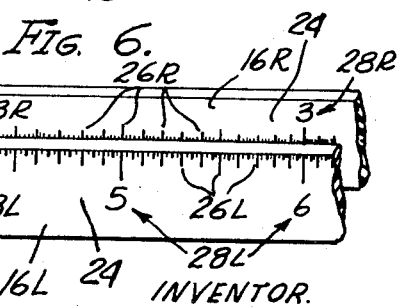
INVENTOR.
CHARLES W. MEHL
By Herbert E. Kidder
AGENT

MAGNETIC STRIP DRAFTING INSTRUMENT

BACKGROUND OF THE INVENTION

This invention pertains to drafting and measuring instruments, and more particularly to an instrument that can be used to make a laminated flexible drafting spline which can be utilized in lofting or other engineering drawing work, to draw fair lines of any desired curvature.

In another of its aspects, the invention pertains to a measuring or calculating device, in which two strips having graduations and indicia provided thereon are used conjointly to measure distances, as in the manner of an extensible measuring tape, or to perform mathematical calculations, as in the manner of a slide rule.

SUMMARY OF THE INVENTION

The primary object of the invention is to provide a new and unique drafting instrument in the form of two elongate strips of flexible elastomeric material having magnetic properties such that the strips cling tightly together, side-by-side, to form a laminated flexible drafting spline, which also clings magnetically to a sheet steel drawing board. This laminated assembly of strips can be bent into any desired curvature and then holds its shape, making it ideal for use in lofting to connect a plurality of points into a smoothly faired curve.

Another object of the invention is to provide an extensible measuring tape in the form of two or more elongated strips of flexible elastomeric material having magnetic properties, as described above, and also having measurement graduations and indicia provided thereon, so that any two of the strips can be slipped endwise with respect to one another to make a tape of specific length, the length dimension of which can be ascertained by adding the full length of one strip to the extended portion of the other strip, using the graduations on the strips. The strips cling so tightly together that they resist any accidental slippage, and it is possible to take a measurement with the tape at one location, and then transport the tape to another location without having the tape change its length in the process.

Still a further object of the invention is to provide a two-piece slide rule comprising two elongated strips of flexible elastomeric material having magnetic properties, as described above, and also having logarithmic graduations and indicia provided thereon, so that the two strips can be slipped endwise with respect to one another in the manner of a conventional slide rule. In this instance, the two strips are placed side-by-side with their respective polarities arranged so that the strips cling together with only half their widths overlapping, instead of their full widths, as in the case when the strips are being used as a drafting spline, or as an extensible measuring tape. Here again, the magnetic attraction of the strips for one another is sufficiently strong to resist any accidental slippage while the slide rule is being read.

These and other objects and advantages of the invention will become apparent to those skilled in the art from the following detailed description of the preferred embodiment thereof, with reference to the drawing.

BRIEF DESCRIPTION OF THE DRAWING

FIG. 1 is a perspective view showing a sheet-steel-faced drawing board having paper attached thereto, and the magnetic strips of the invention being used in two different ways to form flexible drafting splines for drawing curved lines;

FIG. 2 is an enlarged fragmentary sectional view, taken at 2—2 in FIG. 1;

FIG. 3 is an enlarged fragmentary sectional view, taken at 3—3 in FIG. 1;

FIG. 4 is a fragmentary perspective view, depicting two of the magnetic strips clinging together in overlapped relationship, with their graduations and indicia visible and showing how the device is used as an extensible measuring tape;

FIG. 5 is an enlarged sectional view, take at 5—5 in FIG. 4;

FIG. 6 is a fragmentary perspective view, showing two of the strips being used as a slide rule; and FIG. 7 is an enlarged sectional view, taken at 7—7 in FIG. 6.

DESCRIPTION OF THE PREFERRED EMBODIMENT

In the drawings, the reference numeral 10 designates a drawing board having a facing 12 of sheet steel or the like magnetically attractive material on the top surface thereof. A sheet of drawing paper 14 is affixed to the board in the usual manner.

The invention comprises one or more elongated strips 16 of flexible elastomeric material, such as polyvinyl chloride, polyurethane, neoprene, rubber, or the like, having a quantity of permanently magnetized metallic oxide incorporated therein. Preferably, the magnetic material in the strips 16 comprises a mixture of oxides of cobalt, aluminum, nickel and iron which have been sintered together and then pulverized prior to being incorporated in the elastomer.

After the elastomeric material in the strips has been cured (i.e., polymerized), the strips are passed through a powerful electromagnetic field, causing the metallic oxide to become permanently magnetized, with magnetic polarities as shown in FIGS. 5 and 7. In both of these figures, the left-hand strip is designated 16L and the right-hand strip 16R. However, strip 16R in FIG. 7 is reversed end-for-end with respect to strip 16L, which explains why the magnetic polarities for 16R are reversed in FIG. 7 from the way they appear in FIG. 5. It will be noted that each side of each strip has opposite polarities at opposite corners thereof. Thus, in both strips of FIG. 5, the upper left-hand corner is north, the upper right-hand corner is south, the lower right-hand corner is north and the lower left-hand corner is south.

When the two strips are placed side-by-side as shown in FIG. 5, the south pole at the upper right-hand corner of strip 16L is attracted to the north pole at the upper left-hand corner of strip 16R, and the north pole at the lower right-hand corner of strip 16L is attracted to the south pole at the lower left hand corner of strip 16R. As a result, the two strips 16L, 16R cling together as shown in FIG. 5, with the two strips overlapping one another for their full widths.

When one of the strips is reversed end-for-end with respect to the other, its polarities are reversed on all four corners. This condition is illustrated in FIGS. 6 and 7, where strip 16L remains the same as in FIG. 5, except that it has been turned over, whereas strip 16R has been reversed end-for-end and also turned over. It will now be seen that the upper left-hand corner of strip 16R is south, the upper right-hand corner is north, the lower right-hand corner is south, and the lower left-hand corner is north. Placed side-by-side, strips 16L and 16R now take the offset relationship shown in FIG. 7, with only half their respective widths overlapping. This is the relationship used when the strips are utilized as a slide rule, as in FIG. 6.

Each of the strips 16L, 16R has uniformly spaced graduations 18 in units of length along one edge, on one side 20 thereof, as best shown in FIG. 4, together with indicia 22L and 22R. When the strips 16L, 16R are placed together as shown in FIGS. 4 and 5, they can be slipped endwise with respect to one another, so that part of their lengths is overlapped and part is not. In one example (shown in FIG. 4) strip 16R is illustratively 18 inches long, and strip 16L can be presumed to be the same length. It will be noted that the numerals 22R on strip 16R increase from left to right, whereas the numerals 22L on strip 16L increase from right to left. Strip 16L has been pulled to the right so that 10 inches of its length project beyond the right-hand end of strip 16R. Thus, the total length of the extended strips 16R, 16L is 28 inches (18 plus 10).

On the opposite sides 24 of each of the strips 26L, 16R, there are preferably logarithmic graduations 26L, 26R, and indicia 28L, 28R, corresponding to the C and D scales of a slide rule, as best shown in FIG. 6. Both sets of graduations 26L, 26R and indicia 28L, 28R, increase from left to right when the strips are placed together as shown in FIGS. 6 and 7, which necessitates reversing strip 16R end-for-end with respect to strip 16L. At the same time, both strips 16L, 16R have been turned over so that sides 24 face the operator. The strips now cling together with half of their respective widths overlapped, and the graduations and indicia on both strips can be read against one another. The strips 16L, 16R can be slipped endwise with respect to one another without coming apart, in the same manner as a conventional slide rule. A glass slider (not shown) of appropriate cross-sectional configuration and having aligned hairlines that lie flat against the surfaces 24 of strips 16L, 16R can be used if desired, but this is usually not necessary, as the slide rule can be read with reasonable accuracy by merely running the eye up or down from one strip to the other. If desired, the top edge of strip 16L could be beveled, and the graduations 26L could be embossed or printed on the bevel, so as to make it easier to read the slide rule accurately.

Perhaps the most important use of the invention is as a flexible drafting spline, as shown in FIG. 1. In this case, the strips 16L, 16R may be put together as shown in FIG. 5, to make a relatively flexible laminated spline 30, or they may be used singly on their sides, to make a less flexible spline 32. In either case, the magnetic attraction of the strip 16 reaches through the paper 14 to the steel sheet 12 underneath it, and the splines thus cling tightly to the paper, resisting accidental slippage on the paper 14 as the pencil 34 is drawn along one edge thereof. In spline 30, the strips 161, 16R stand on edge, and when the spline is bent around a sharp curve, the outer strip is able to slip over the inner strip to accommodate the difference in their circumferential lengths due to the slight difference in radial distance of the strips from the center of the curve. Thus, the laminated spline 30 is able to bend around a much smaller radius than spline 32, which bends on its wide edge. Spline 32 is primarily for drawing faired curves of relatively large radius.

The laminated spline 30 is not limited to two strips 16L, 16R, but may be made up of as many strips as desired. The more strips, the greater the magnetic attraction of the spline to the steel sheet 12, and the greater its resistance to accidental displacement on the paper. However, a greater number of strips has a stiffening effect on the spline and makes it difficult to bend the spline around a small radius on an outside curve.

In still another aspect, the invention may be embodied in a French curve, triangle, ellipse template, or other similar drafting instrument of the type that is laid flat against the paper to provide an edge along which a pencil, or scriber is drawn. The drafting instrument may be made of any synthetic resin having magnetic oxides incorporated therein which are permanently magnetized so that the instrument is magnetically drawn to the sheet steel (or other magnetically attractive facing material) on the board underneath the paper. Alternatively, the drafting instrument may be made of conventional material that has been painted with a thick coat of paint having a large proportion (e.g., 90–95 percent by weight) of magnetic oxide powder incorporated therein, which is subsequently magnetized. In either case, the instrument is magnetically attracted to the board, and thus is pressed tightly down against the paper. The increased frictional resistance produced by the pressure causes the instrument to resist accidental sliding over the paper during use.

While I have herein shown the strips 16 to be of rectangular cross-section, with a width dimension approximately four times the thickness dimension, it will be understood that these dimensions are not critical, and that the strips 16 might take various other cross-sectional configurations. Various other changes may be made without departing from the scope of the invention, as defined in the following claims:

I claim:

1. An engineering instrument comprising a pair of elongated strips of magnetic elastomeric material, said strips being rectangular in cross section, and said material being polarized so that diagonally opposite corners of each of said strips have the same polarity, and opposite edges of each of the four sides of each strip are of opposite polarity, whereby said strips cling together side-by-side by mutual attraction;

said strips overlapping one another for their full widths when placed together with their respective ends in one order, and said strips overlapping half their respective widths when one strip is turned end-for-end from said one order;

said strips being slidable lengthwise with respect to one another when adhered together in overlapping relationship; and graduations and indicia provided on one side of each of said strips along the length thereof, the graduations and indicia of one strip being registrable with the graduations and indicia of the other strip when said strips overlap for half their respective widths to provide a reading that is a function of the relative lengthwise position of one strip with respect to the other;

said strips being firmly held together by magnetic attraction so that accidental displacement is resisted.

* * * * *